W. MUNSON.
Fifth Wheel for Vehicles.
No. 88,196.  Patented March 23, 1869.
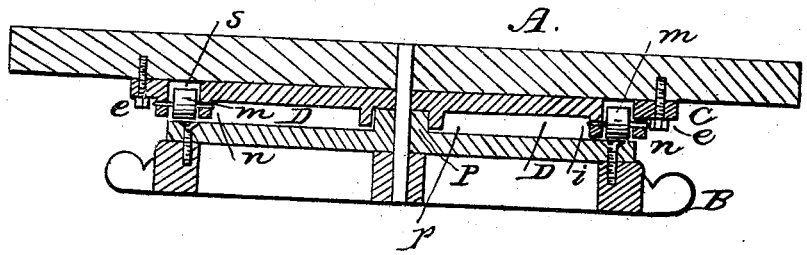
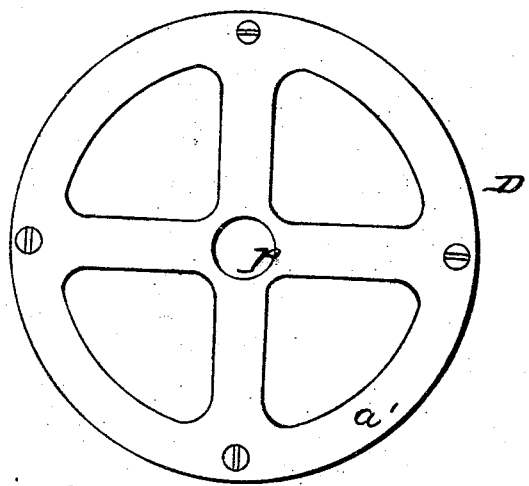
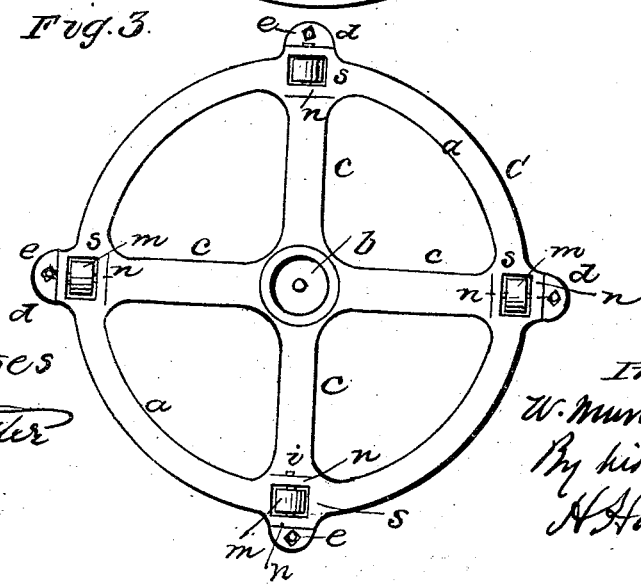

WILLIAM MUNSON, OF ABINGTON, PENNSYLVANIA.

Letters Patent No. 88,196, dated March 23, 1869.

IMPROVED FIFTH-WHEEL.

The Schedule referred to in these Letters Patent and making part of the same.

*To all whom it may concern:*

Be it known that I, WILLIAM MUNSON, of Abington, Luzerne county, Pennsylvania, have invented an Improvement in Vehicles; and I do hereby declare the following to be a full, clear, and exact description of the same.

My improvement relates to that part of a vehicle styled the fifth-wheel; and consists of two plates, one provided with a hub, and the other having certain friction-rollers and recesses, and a hollow hub, for the reception of the projection on the other plate, all as fully described hereafter, so as to reduce the friction of the bearing-surfaces between the body and the axle, and prevent the injury and loss of any of the devices employed.

In order to enable others skilled in the art to make and use my invention, I will now proceed to describe its construction and operation.

On reference to the accompanying drawing, which forms a part of this specification—

Figure 1 is a sectional view of my improved fifth-wheel for vehicles;

Figure 2, a plan view of the lower rim, or bed; and

Figure 3, an inverted plan view of the upper rim of the wheel.

A is a portion of the frame of the vehicle, and B, a portion of the frame, attached to the front axle; and to the portion A is secured a metal plate or wheel, C, having an annular rim, a, hollow hub b, and radial arms c, connecting the hub to the rim.

On the rim a are lips d, and through the latter pass bolts e, by which the wheel is secured to the frame of the vehicle, the rim, adjacent to each lip d, having a recess, s, for the admission of a friction-roller, m, which turns on a pin, i, extending through lugs n n on the rim.

The pins i are slightly enlarged at their outer ends, to prevent them from passing through the lugs toward the hub of the wheel.

To the frame B is secured the bed or plate D, consisting of a rim a', connected by radial arms to a central hub, p, the latter being adapted to the interior of the hollow hub b of the wheel C, and of such a height as to afford a bearing at its upper end for the wheel, when the friction-rollers m of the latter bear upon the rim a', as shown in fig. 1.

Through the frames A and B, and through the wheel C and bed D, passes the usual king-bolt, which secures the whole together, without interfering with the rotation around the same of any of the parts; but it will be seen that all lateral strain upon the king-bolt is prevented by the hollow hub b, which enclosing the hub, or projection p, prevents any lateral movement of the two plates independently of each other, while the bearing afforded for the wheel, at the upper end of the hub h, relieves the pins i from the weight of the vehicle. The upper face of the projection may be made of steel, and is effectually excluded from dust, and consequently prevented from wearing away as rapidly as it would if not enclosed by the hollow hub.

Owing to this arrangement also, the necessity of forming an annular ledge, or flange at the outer edge of the rim a', to prevent independent lateral movements of the two plates, is avoided, and the wear and destruction of the friction-rollers, which result in such cases, or when they are caused to run in grooves, or are grooved to receive projecting rims, are prevented.

Owing to the situation of the bolts e, with their heads directly opposite the outer ends of the pins i, the withdrawal of these pins, except after the removal of the bolts, and the consequent loss of the pins durn g the movements of the vehicle, is prevented; and iit will be seen that if one or more of the pins i should break, the pockets, or recesses s will retain and prevent the loss of the rollers.

It will also be seen that these recesses or housings receive the rollers, and permit the two plates to be brought close together, and obviate the necessity of elevating the body of the wagon to too great a degree.

I aware that friction-rollers have been used in connection with the fifth-wheels of vehicles, and I do not therefore claim the same broadly; but

I claim as my invention, and desire to secure by Letters Patent—

1. The wheel or plate C, and its lugs n n, recesses s, pins i, and rollers m, when the said recesses are so formed to prevent the escape of the rollers, in case of the breaking of the pins, as set forth.

2. The combination of the wheel C, its rollers and hollow hub b, and the plate D, and its projection p, the whole being constructed and adapted to each other, substantially as described.

3. The arrangement of the bolts e, in respect to the pins i, of the friction-rollers, as and for the purpose specified.

In testimony whereof, I have signed my name to this specification, in the presence of two subscribing witnesses.

WM. MUNSON.

Witnesses:
 DANIEL HANNAH,
 H. M. HANNAH.